(12) United States Patent
Stafford et al.

(10) Patent No.: US 9,310,195 B2
(45) Date of Patent: Apr. 12, 2016

(54) APPARATUS ADAPTED TO PROVIDE AN INDICATION OF AN ANGULAR POSITION OF AN INPUT MEMBER OVER MULTIPLE TURNS

(75) Inventors: Thomas Richard Stafford, Bristol (GB); Stuart Masefield Lay, Chippenham (GB); Alan Stephen Budden, Dursley (GB); Philip Stephen Hinchliffe, Stockport (GB)

(73) Assignee: Rotork Controls Limited, Bath, Avon (GB)

( * ) Notice: Subject to any disclaimer, the term of this patent is extended or adjusted under 35 U.S.C. 154(b) by 530 days.

(21) Appl. No.: 13/816,659

(22) PCT Filed: Aug. 24, 2010

(86) PCT No.: PCT/GB2010/051396
§ 371 (c)(1),
(2), (4) Date: May 3, 2013

(87) PCT Pub. No.: WO2012/025703
PCT Pub. Date: Mar. 1, 2012

(65) Prior Publication Data
US 2013/0212893 A1    Aug. 22, 2013

(51) Int. Cl.
*G01B 21/22*    (2006.01)
*G01D 5/04*    (2006.01)
*G01D 5/245*    (2006.01)

(52) U.S. Cl.
CPC *G01B 21/22* (2013.01); *G01D 5/04* (2013.01); *G01D 5/2451* (2013.01)

(58) Field of Classification Search
CPC .......... G01B 21/22; G01D 5/04; G01D 5/2451
USPC ................................ 33/1 PT, 1 N, 534, 501.7
See application file for complete search history.

(56) References Cited

U.S. PATENT DOCUMENTS

| 4,183,014 A | 1/1980 | McClean et al. |
| 4,572,951 A | 2/1986 | Toda et al. |

(Continued)

FOREIGN PATENT DOCUMENTS

| CN | 101082508 A | 12/2007 |
| DE | 3415091 C1 | 11/1985 |

(Continued)

OTHER PUBLICATIONS

AUMA, A Step Beyond-AUMA Generation .2, AUMA at the ACHEMA 2009; Press release; May 11, 2009.

(Continued)

*Primary Examiner* — R. A. Smith
*Assistant Examiner* — Tania Courson
(74) *Attorney, Agent, or Firm* — Quarles & Brady LLP

(57) ABSTRACT

Apparatus (100) adapted to provide an indication of an angular position of an input member (106) over multiple turns includes at least two rotatable members (104A-104D) configured, in use, to rotate in accordance with rotation of an input member (106), and at least one sensing device (114A) configured to measure and output an angular position of at least one of the rotatable members. The rotatable members are configured to rotate simultaneously but at different rates. The apparatus further includes a device (114) configured to use the angular position measurements from the at least one sensing device to produce an cation of an angular position of the input member over multiple turns.

26 Claims, 7 Drawing Sheets

(56) References Cited

U.S. PATENT DOCUMENTS

| | | |
|---|---|---|
| 4,616,131 A | 10/1986 | Burkhardt |
| 4,654,522 A | 3/1987 | Gornick et al. |
| 4,712,088 A | 12/1987 | Ernst |
| 4,730,110 A | 3/1988 | Spaulding |
| 4,733,116 A | 3/1988 | Schulz |
| 4,990,909 A | 2/1991 | Ueda et al. |
| 5,038,243 A | 8/1991 | Gordon |
| 5,109,193 A | 4/1992 | Pike |
| 5,218,769 A * | 6/1993 | Tranchon ............ 33/1 PT |
| 5,233,355 A | 8/1993 | Di Stefano et al. |
| 5,332,895 A | 7/1994 | Rieder et al. |
| 5,457,371 A | 10/1995 | Gordon |
| 5,640,007 A | 6/1997 | Talbott et al. |
| 5,796,250 A | 8/1998 | Dames |
| 5,930,905 A * | 8/1999 | Zabler et al. ............ 33/1 PT |
| 6,341,426 B1 * | 1/2002 | Okumura ............ 33/1 PT |
| 6,396,386 B2 * | 5/2002 | Okumura ............ 338/180 |
| 6,519,549 B1 | 2/2003 | Lin et al. |
| 6,683,543 B1 | 1/2004 | Yeo |
| 6,861,837 B1 * | 3/2005 | Shimizu et al. ............ 324/207.25 |
| 7,040,025 B2 * | 5/2006 | Inoue ............ 33/1 PT |
| 7,292,028 B2 | 11/2007 | Hahn |
| 7,406,772 B2 | 8/2008 | Siraky |
| 7,547,875 B1 | 6/2009 | Tsai et al. |
| 7,751,997 B2 | 7/2010 | Steinlechner et al. |
| 7,772,836 B2 * | 8/2010 | Isobe et al. ............ 324/207.25 |
| 7,774,945 B2 * | 8/2010 | Sano ............ 33/1 PT |
| 2001/0003435 A1 * | 6/2001 | Okumura ............ 338/176 |
| 2003/0112157 A1 | 6/2003 | Strasser |
| 2006/0032062 A1 | 2/2006 | Besier et al. |
| 2007/0180714 A1 | 8/2007 | Siraky |
| 2008/0048653 A1 | 2/2008 | Sanders |
| 2008/0307873 A1 | 12/2008 | Kang et al. |
| 2009/0058400 A1 | 3/2009 | Isobe et al. |
| 2010/0194385 A1 | 8/2010 | Ronnat et al. |

FOREIGN PATENT DOCUMENTS

| | | |
|---|---|---|
| DE | 4409892 A1 | 9/1995 |
| DE | 19821467 A1 | 11/1999 |
| DE | 102005058224 A1 | 6/2007 |
| DE | 102007010737 A1 | 8/2008 |
| EP | 0046232 A1 | 2/1982 |
| EP | 0201106 A2 | 11/1986 |
| EP | 0794409 A | 9/1997 |
| EP | 1408305 A2 | 4/2004 |
| EP | 1457762 A1 | 9/2004 |
| EP | 1477389 A2 | 11/2004 |
| EP | 1522486 A2 | 4/2005 |
| FR | 2697081 A1 | 4/1994 |
| JP | 55052910 A | 4/1980 |
| JP | 62261015 A2 | 11/1987 |
| JP | 63201523 A2 | 8/1988 |
| JP | 1101416 A | 4/1989 |
| JP | 2242117 A | 9/1990 |
| JP | 4022817 B4 | 4/1992 |
| JP | 2000-088605 | 3/2000 |
| JP | 2000-121389 | 4/2000 |
| JP | 2006-258452 | 9/2006 |
| WO | 8404587 | 11/1984 |
| WO | 0229443 | 4/2002 |
| WO | 03069270 | 8/2003 |
| WO | 2006064236 | 6/2006 |
| WO | 2007110603 | 10/2007 |
| WO | 2007141021 | 12/2007 |

OTHER PUBLICATIONS

AUMA, Electric multi-turn actuators with integral controls, product brochure; Mullheim, Germany, Apr. 22, 2013.

International Search Report; PCT/GB2010/051396; Apr. 12, 2011.

\* cited by examiner

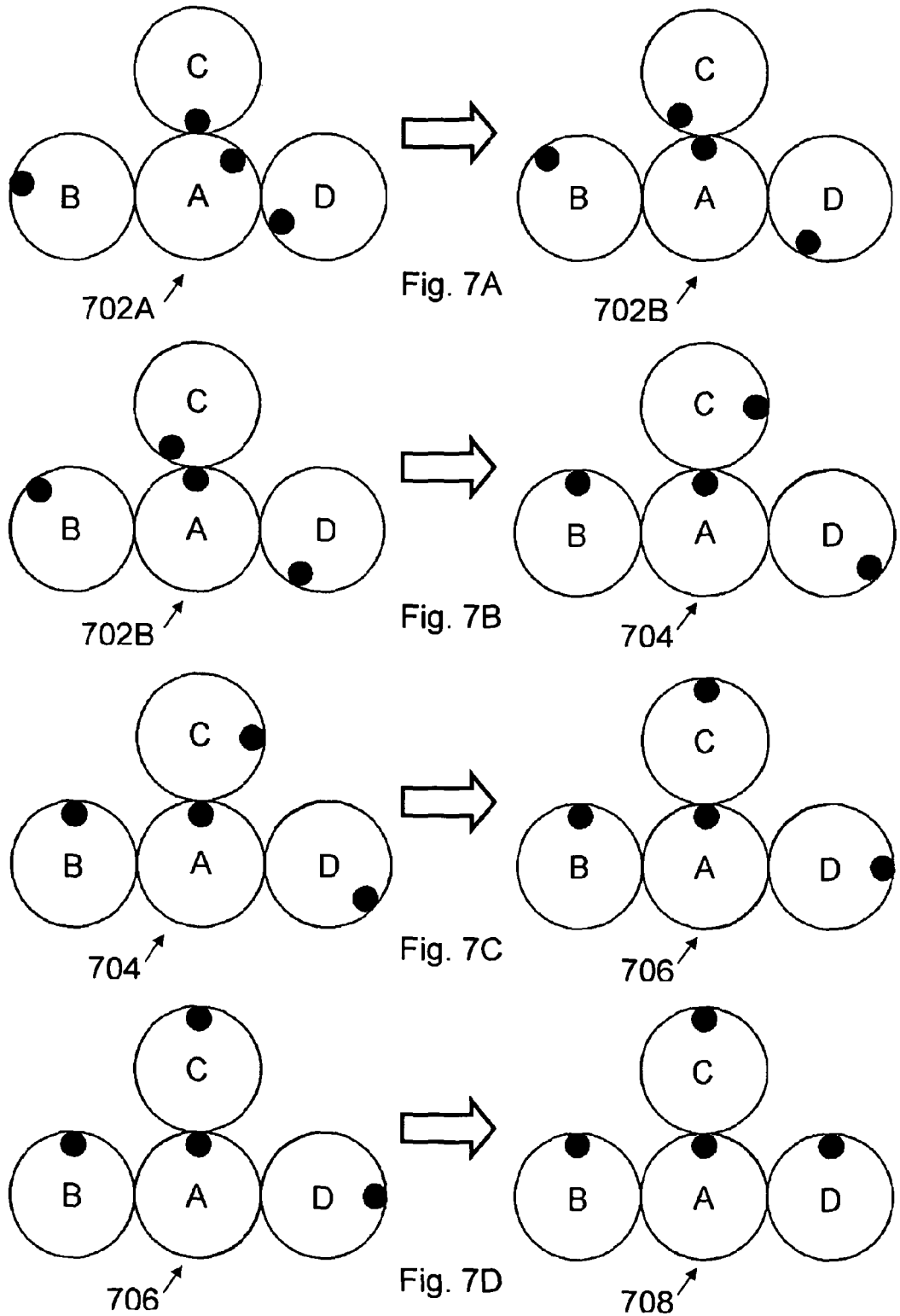

ance with one or more design parameters. For instance, the rotatable members may be arranged so that there is no common factor (other than one) amongst the ratios of revolution. The rotatable members may comprise gears with different numbers of teeth.

APPARATUS ADAPTED TO PROVIDE AN INDICATION OF AN ANGULAR POSITION OF AN INPUT MEMBER OVER MULTIPLE TURNS

CROSS-REFERENCE TO RELATED APPLICATIONS

This application represents the national stage entry of PCT International Application No. PCT/GB2010/051396 filed Aug. 24, 2010, which is hereby incorporated herein by reference for all purposes.

STATEMENT REGARDING FEDERALLY SPONSORED RESEARCH OR DEVELOPMENT

Not Applicable

BACKGROUND OF THE INVENTION

The present invention relates to apparatus adapted to provide an indication of an angular position of an input member over multiple turns.

Position-indicating devices, such as encoders, are used in many applications, including detecting the position of mechanically-driven actuators required for operating fluid valves, for example. An absolute encoder is an encoder that can identify a position of an input member in an absolute sense, e.g. as a specific angular position. Such encoders may be depowered and will still normally be capable of indicating the position in absolute terms when power is restored, even if the encoder moved whilst the power was off. A multi-turn absolute encoder typically includes several gears in order to determine the absolute position over multiple turns. However, if a sensing device of the encoder happens to fall into an intermediate position, e.g. between two index positions, then the measurement may be indeterminate. Further, if one of the sensing elements fails then the entire encoder device will usually fail.

SUMMARY OF THE INVENTION

Embodiments of the present invention are intended to address at least some of the issues discussed above.

According to a first aspect of the present invention there is provided apparatus adapted to provide an indication of an angular position of an input member over multiple turns, the apparatus including:

at least two rotatable members configured, in use, to rotate in accordance with rotation of an input member;

at least one sensing device configured to measure and output an angular position of at least one of the rotatable members, and a device configured to use the angular position measurements from the at least one sensing device to produce an indication of an angular position of the input member over multiple turns, wherein the rotatable members are configured to rotate simultaneously but at different rates.

Each of the rotatable members can have a ratio of revolution with respect to the other rotatable member(s). Each of the rotatable members may have any unique (amongst the rotatable members) ratio of revolution and there may not be any restriction on selection of the ratios, e.g. the ratios need not be selected so that they satisfy a particular relationship, e.g. to work with a decoding algorithm that requires the rotatable members to have indexing positions of an integer base. Alternatively, the selection of the ratios may be made in accordance with one or more design parameters. For instance, the rotatable members may be arranged so that there is no common factor (other than one) amongst the ratios of revolution. The rotatable members may comprise gears with different numbers of teeth.

In use, the rotatable members normally move along with the input member in a continuous, non-stepped manner. The sensing devices can provide an absolute position measurement over 360° of one or more of the rotatable members, e.g. using optical, magnetic or RF sensing technology. The apparatus may include A to N said rotatable members, each having a respective ratio of revolution $R_A$ to $R_N$, and wherein a said sensing device has a maximum allowable peak error calculated as:

$$\text{Maximum Sensor Error} = \frac{180°}{R_A + R_N}.$$

In some embodiments, one of the plurality of rotatable members may be a primary rotatable member that drives all remaining said rotatable members (i.e. the remaining rotatable members do not drive any other of the rotatable members).

The plurality of rotatable members may each have a notional zero/initial/starting (rotation) position. The device may be configured to produce the position indication by computing how far the rotatable members have passed from their zero positions. The computing performed by the device can involve virtually winding-back at least one, and typically all, of the rotatable members to its respective zero position. The device may be configured to:

virtually wind back a first one of the rotatable members in a sequence to its zero position; then for each said rotatable member other than the first rotatable member in the sequence:

computing a virtual position of the rotatable member based on an angle through which a previous rotatable member in the sequence has turned when being virtually wound back, and virtually winding back the rotatable member and all the previous rotatable member(s) in the sequence so that they are at their zero positions.

The computing step may use stored data, such as a look-up table, representing a position of a said rotatable member when the previous rotatable member(s) in the sequence is/are all at their zero position(s), and data representing how many times all of the previous rotatable members in the sequence have passed through their zero positions together when the rotatable member is in a corresponding said position.

The rotatable members may be arranged in a co-planar or co-axial manner.

A set comprising more than one said sensing device may be provided for measuring the position of a single said rotatable member, such that if one of the sensing devices in the set develops a fault that another said sensing device in the set is used instead.

The apparatus may not be provided with constant power. In some embodiments, the sensing devices measure positions of the rotatable members resulting from movement whilst power was not provided to the apparatus. A switch arrangement may be included to enable the sensing devices to be activated when the rotatable member(s) move.

According to another aspect of the present invention there is provided a method of providing an indication of an angular position of an input member over multiple turns, the method including:

measuring an angular position of at least two rotatable members configured, in use, to rotate in accordance with rotation of an input member, the rotatable members being configured to rotate simultaneously but at a different rates, and producing an indication of an angular position of the input member over multiple turns using the angular position measurements.

The method may further include:

taking position measurements of a first one of the rotatable members over a period of time;

taking position measurements of another of the rotatable members over the period of time;

comparing the measured position of the other rotatable member with an expected position of the other member, given the measured positions of the first member and a known relationship between rotations of the members, and if the measured position of the other rotatable member does not correspond with the expected position then flagging a possible read error state.

The method may include checking for read errors by detecting lack of angular rotation of at least one of the rotatable members.

The method may include determining an absolute position of the input member by using data relating to an angular position of a single one of the rotatable members, or a combination of positions of a subset of the rotatable members. The method can include, upon detecting failure of one (or more) of the rotatable members:

measuring an angular position of non-failed said rotatable member(s), and producing an indication of an angular position of the input member over a reduced range of multiple turns using the angular position measurements of the non-failed rotatable member(s).

The method may further include providing at least one incremental counter associated with at least one of the rotatable members, and using output from the at least one incremental counter to calculate the position of the input member based on a count of multiple turns of the at least one associated rotatable member.

According to an alternative aspect of the present invention there is provided a method of providing an indication of an angular position of an input member over multiple turns, the method including:

measuring a position of a plurality of rotatable members that, in use, move in accordance with movement of an input member, each of the rotatable members having a notional zero/initial/starting (rotation) position, and computing how far the rotatable members have passed from their zero positions to produce the input member multi-turn angular position indication.

A computer program product configured to perform at least part of a method substantially as described herein may also be provided.

BRIEF DESCRIPTION OF THE DRAWINGS

The invention extends to any feature, or any combination of features described herein, whether or not that combination is explicitly described herein.

The invention can be put into effect in numerous ways, one example only being described and illustrated with reference to the drawings, wherein:

FIGS. 7A-7D relate to a worked example of operation of the embodiment;

DETAILED DESCRIPTION OF THE INVENTION

Figure 1:
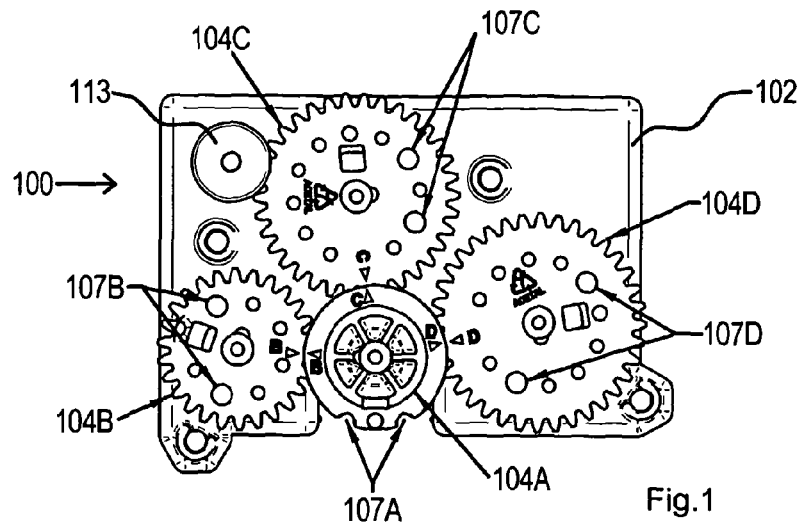
FIG. 1 is a plan view of a partially-assembled example embodiment.
Figure 2:
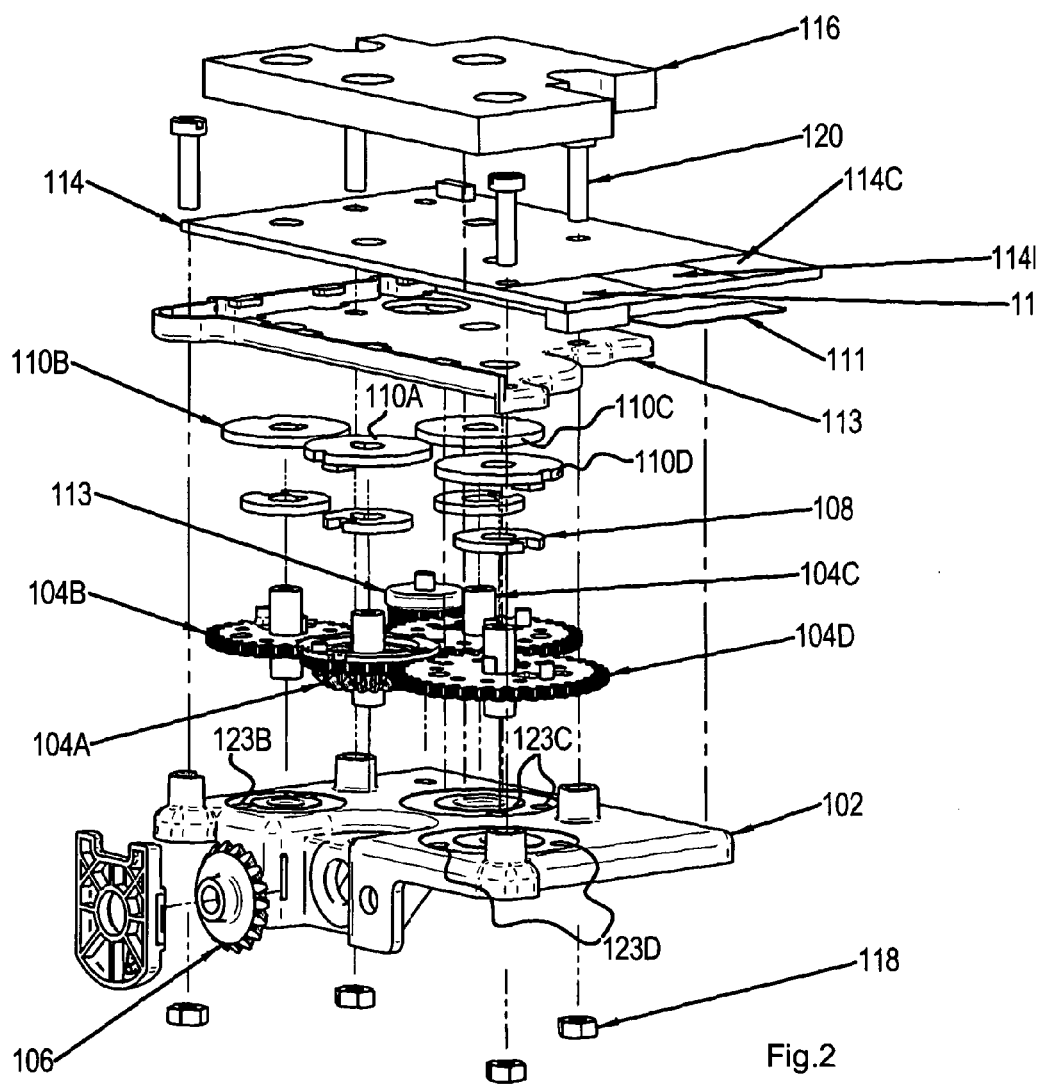
FIG. 2 is an exploded view of the example embodiment.

Referring to FIGS. 1 and 2, an example position-indicating device 100 is shown. The device comprises a housing base plate 102 on which rotatable members 104A-104D can be fitted. In the example, there are four rotatable members, which take the form of toothed gears 104A-104D. However, it will be appreciated that other types of rotatable members can be used and they need not include formations such as teeth for directly driving each other.

A first gear 104A can be considered to comprise a primary gear that drives the other three gears 104B-104D, i.e. the three other gears 104B-104D only engage with the teeth of the first gear 104A, and not each other. The first gear is driven by an input gear 106, which rotates in accordance with an input member, which may be a column of a valve actuator, for example (see FIG. 3). Thus, the first gear 104A is directly driven by the input gear 106, whilst the other three gears 104B-104D are indirectly driven by the input gear (via the first gear 104A). It will be appreciated that in other embodiments more than one, or all, of the gears could be directly driven by the input gear.

The example device 100 is assembled with the gears 104A-104D in their correct "zero positions". To assist with this, one or more of the gears (and/or housing components) can include markings. In the example, the first gear 104 includes markings in the form of three arrows. These are intended to be aligned with correspondingly-marked arrows on the other gears 104B-104D. Additionally or alternatively, "zero location holes" 107A-107D may be provided on the gears, which can be aligned with corresponding markings/recesses 123B-123D on the base plate 102 (some visible in FIG. 2). A jig (not shown) can be used to assist with the assembly. A bar code label 111 can be fitted in the device 100 as well as upper foam padding 116.

In the example device the gears and housing members comprise moulded plastic parts. Due to the high tolerance for backlash in the device and its low precision requirements, such low cost components can be used; however, it will be understood that other materials can be used and that the design and dimensions of the device can vary from the illustrated example. Having a single drive arrangement in the form of gear 104A as in the illustrated example has the benefit of reducing the effects of backlash; however, it will be appreciated that other arrangements, e.g. gears in train driving one another, can be used.

Returning to the example illustrated in FIGS. 1 and 2, each of the four gears 104A-104D is fitted with a respective sensor-compatible component 110A-110D, e.g. magnet for a magnetic sensing device. Spacers 108 are fitted between the gears and the components 110. An upper housing plate 113 is fitted above the components and this also houses a printed circuit board 114. The board includes circuitry that functions as a sensing device (shown schematically at 114A) that can sense the positions of the sensor-compatible components 110A-110D and thereby provide an absolute position measurement of the four gears over 360°. The sensing arrangement may be based upon any angular sensing technology, e.g. optical, magnetic or RF. RF and magnetic sensors can also offer in-built fault detection: if a magnet gets detached from a gear or demagnetised, the sensor can detect this. It is also possible to use sensor devices that provide an analogue output.

It will be understood that in alternative embodiments the rotatable members may include integrated sensor-compatible components or their angular positions may be determined by the sensor by in another way, such as by visually identifying the angular position, e.g. by detecting a marking on a surface of the rotatable member. It will be appreciated that in alternative embodiments the sensing device and/or processor may be located remotely from other components of the device with signals being transferred by means of wireless/RF signals, for example. In other embodiments, sensing devices may be built into the rotatable members/gears. Other variations to the example device 100 shown in the Figures can be produced. For instance, the rotatable members may be arranged in a co-axial rather than co-planar manner (or a combination of co-axial/co-planar, or any other arrangement), which can result in size reduction/design benefits.

The circuit 114 further includes a processor (shown schematically at 114B) configured to produce a position indication of the input member 106 over multiple turns using the sensing device measurements, as will be described below. Although a digital electronic processor is shown in the example, it will be appreciated that the functionality it provides could be performed by suitable analogue components/circuitry.

A mechanical switch can be included to enable the electronic sensing to be activated after the sensing elements/gears have started to move. The switch may be activated mechanically or magnetically and there is therefore no need to supply constant power to the device, thus potentially reducing the overall power consumption of the device. After power-up, the device can detect any movement that occurred whilst the power was off and use that measurement to provide a position indication. The example device includes a magnetic "wake up" switch in the form of a gear 113 that rotates when the gear train rotates and can be used to trigger the power supply to the device, but it will be appreciated that alternative arrangements can be provided.

The rotatable members in the device are configured to rotate at different rates. In the example device 100 this is achieved by having a different number of teeth on all of the gears 104A-104D. However, it will be appreciated that it can be achieved by different means. For instance, providing inter-engaging rotatable members that have different dimensions (e.g. radius or circumference) can result in the members having different ratios of revolution. Further, rotatable members that don't directly engage with/drive each other, e.g. disks, could be used, the members being driven directly by the input member or connected together by means of a belt or chain drive, or any other gearing mechanism.

The range of operation of the device will be determined by calculating the maximum number of turns of the first analy-sed, or "primary", member before a repeating pattern of the rotating members occurs, at which point the absolute position can no longer be determined from the individual positions of the members. This can be calculated as the number of turns required to rotate the device from its reference position until it returns to this position. To improve the range, minimum functions of the ratios of revolution can be increased.

For example, in a simple case where the device includes two rotatable members A and B, if the ratios of revolution of the two members were 10 and 20, respectively, then these ratios have a common factor of 10, and so can be simplified to a 1:2 ratio. Such an assembly can only be used to give a position indication over two turns. However, if gear B was selected so as to have 21 teeth instead of 20 then there would be no such common factor, and the simplest expression would remain as 10:21. Given this relationship, if A was to be rotated twice then member B would move to a position 342.9° (720°× 10/21) from its zero position. As both members are not at their reference positions and the device has not returned to its overall starting position the range of this device can be calculated as the number of times member A must rotate for member B to be zero at the same time, i.e. 21 turns. When member B has been rotated by exactly 10 turns, both A and B will be zero and the device will be at its overall starting position.

In a conventional multi-turn absolute encoder arrangement there is a mechanical indexing mechanism between the members that increments each one after a defined rotation of the previous members, i.e. if a member has been indexed a certain number of times then the previous members will have rotated by a known amount. However, no such indexing mechanism is present in the continually moving (along with the input member), non-stepping position-providing device described herein; rather, embodiments of the device can have a virtual indexing mechanism, which may take the form of the decoding algorithm described below. Reference (or starting/initial/zero) positions are defined for each rotatable member and these can lie anywhere in the 360° of possible rotation, provided each member moves in such a way that all of the members can be at their reference positions at the same time. This will usually define the device's overall zero position.

Such a "virtual indexing mechanism" has the effect of taking almost arbitrary looking position measurements and allowing them to be decoded to provide an indication of an actual position. In conventional indexing mechanisms, each member is measured in sequence, with each contributing a proportion of the position depending on the mechanism. This information is immediately available as the members are read; however, in embodiments of the present device there may not be such an obvious relationship. In order to decode the position, each member is sensed in sequence and then decoded. The primary member must be used in order to find a "wound-back" position of the next rotatable member. This calculation step provides information that is directly relevant to the absolute position of the input member. To obtain the absolute position the angular positions of the rotatable members are measured and then a calculation is performed to find the rotation contribution so that the next calculation can be performed, and so on.

Figure 3:
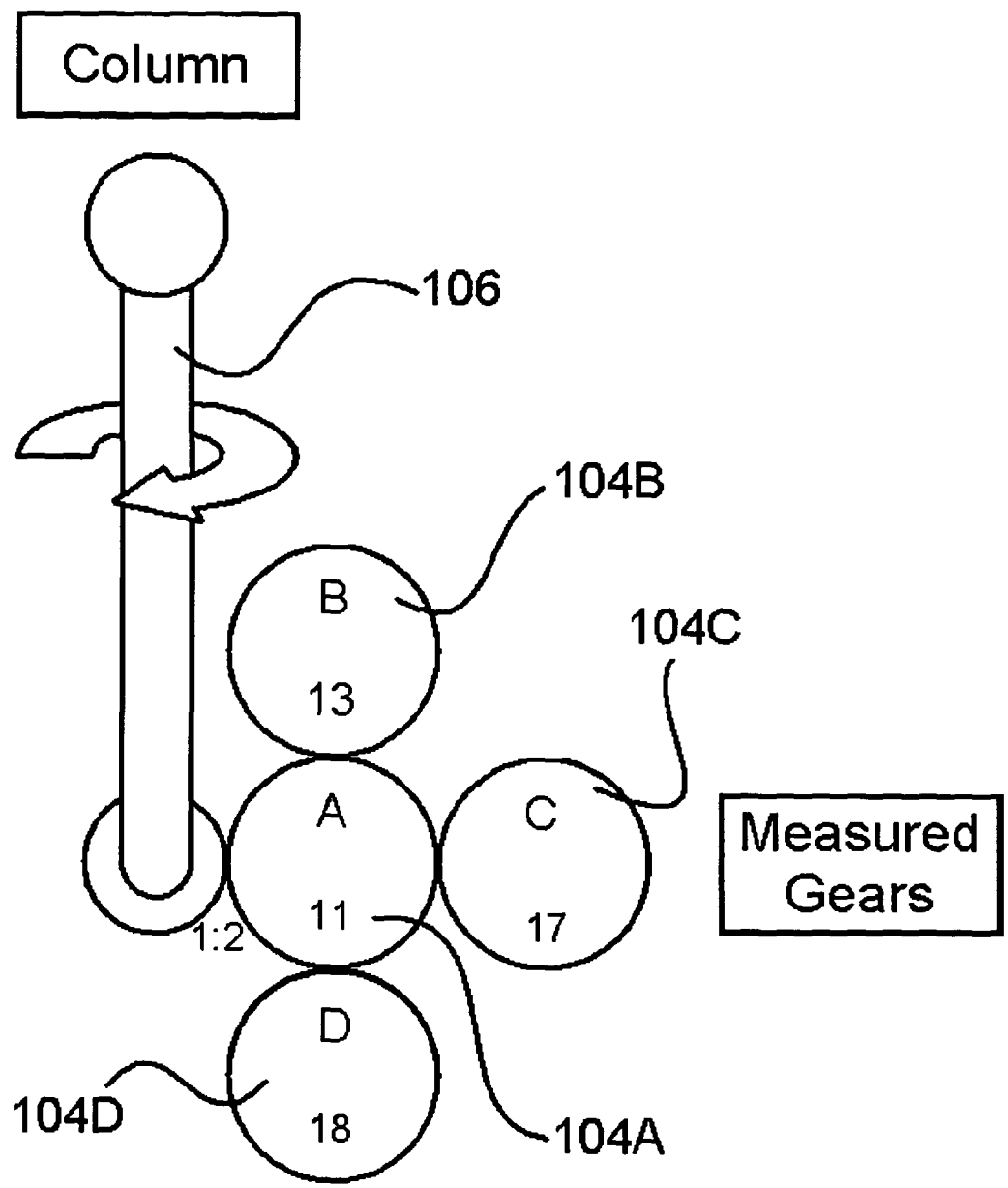
FIG. 3 is a schematic drawing of sensing elements in an example embodiment.

Referring to FIG. 3, examples of the number of teeth on the four gears 104A-104D are given as follows: gear 104A: 22 teeth; gear 104B: 26 teeth; gear 104C: 34 teeth, and gear 104D: 36 teeth, and so the minimum functions of the ratios of revolution of the gears 104A-104D are 11, 13, 17 and 18, respectively. The example ratios mean that gear 104A will rotate 13/11 times the speed of gear 104B, and gear 104D will rotate 17/18 times the speed of gear 104C, and so on. These ratios have no integer common factors; however, if the ratios were 11, 13, 15, and 18 for instance, instead then there would be a common factor of 3 (for 15 and 18), which would have an effect on the way the gears move together and how far the input can rotate before a repeating position sequence appears, thus the absolute range would be reduced.

When the first gear 104A is used as the primary measurement gear, the maximum number of turns of that gear, from which the absolute position of the mechanism can be derived, is equal to the product of the minimum functions of the ratios of revolution of the other gears 104B-104D. Thus, in general, combinations of n gears (denoted A, B, C, . . . , n) can be used to determine absolute gear position over a range of X turns. If the first gear 104A is used as the primary measurement gear then the absolute position range of the device can be determined by the equation:

$$X = B \times C \times D \ldots \times n$$

where B, C, D, . . . n, are the minimum functions of the ratios of revolution between each gear and there is no common multiple between the minimum functions of the ratios of revolution of all sensed elements. Thus, for the example of FIG. 3, X=3978 (13×17×18). In another example, the number of teeth on the four gears are: gear 104A: 7 teeth; gear 104B: 11 teeth; gear 104C: 13 teeth, and gear 104D: 15 teeth, in which case X=2145.

In order to find the total number of rotations of the input member 106, each of the gears 104A-104D are in effect "wound back" to their zero positions. Whilst doing this, the total number of rotations is recorded so that it can be related to the position of the input. In the example device the rotation of the first gear 104A is first recorded. Thus, by recording how far all the gears in the device have rotated it is possible to calculate the current multi-turn position of the input member. It will be appreciated that the gears are not normally physically wound back; for instance, a software/firmware simulation or other process intended to calculate the number of movements/rotations can be used, or any other electromechanical or electronic implementation of this function.

Figure 4:
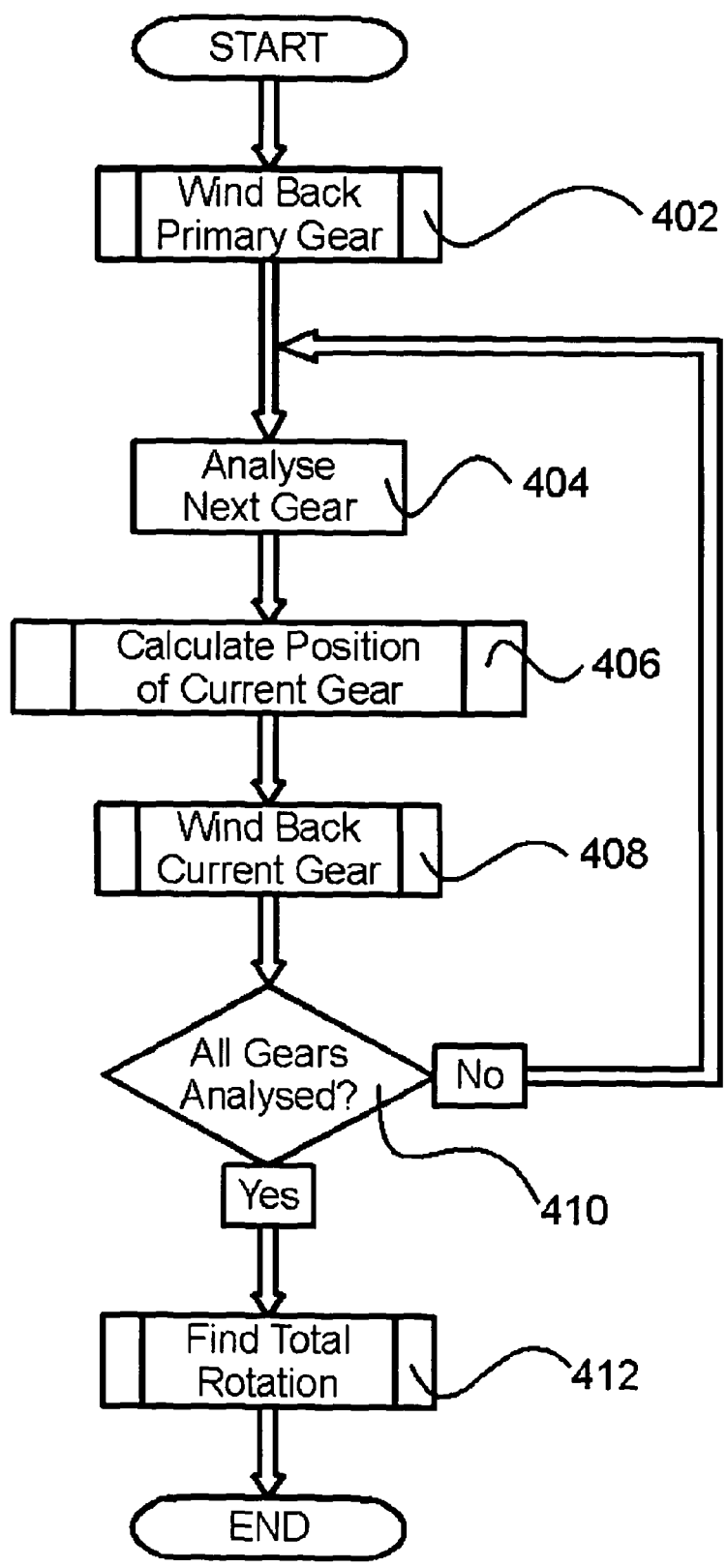
FIG. 4 is a flowchart showing operation of the embodiment, including a position calculation step and a gear "virtual wind back" step.

Referring to FIG. 4, a flowchart of an example method of the calculation of the total number of rotations is shown. The notation below shall be used in the following description, with gears 104A-104D being referred to as "A"-"D", respectively:

$\phi_A$: Gear A Position
$\phi_B$: Gear B Position
$\phi_C$: Gear C Position
$\phi_D$: Gear D Position
PR: Primary Ratio (1:2 in example of FIG. 3, i.e. two rotations of input column=1 rotation of primary gear A)
$R_A$: Gear A Teeth Ratio (11 in the example, i.e. the number of gear teeth with any common factor removed)
$R_B$: Gear B Teeth Ratio (13 in the example)
$R_C$: Gear C Teeth Ratio (17 in the example)
$R_D$: Gear D Teeth Ratio (18 in the example)
$\theta_{TOTAL}$: Total Gear A Turns
$\theta_A$: Gear A Turns from A Wind-Back
$\theta_B$: Gear A Turns from B Wind-Back
$\theta_C$: Gear A Turns from C Wind-Back
$\theta_D$: Gear A Turns from D Wind-Back
$X_B$: Number of Zero Cycles from B
$X_C$: Number of Zero Cycles from C
$X_D$: Number of Zero Cycles from D At step 402 the primary gear 104A is virtually "wound back" to its zero position. The number of rotations required to achieve this corresponds to its current position, $\phi_A$, and so $\theta_A = \phi_A$.

Figure 5:
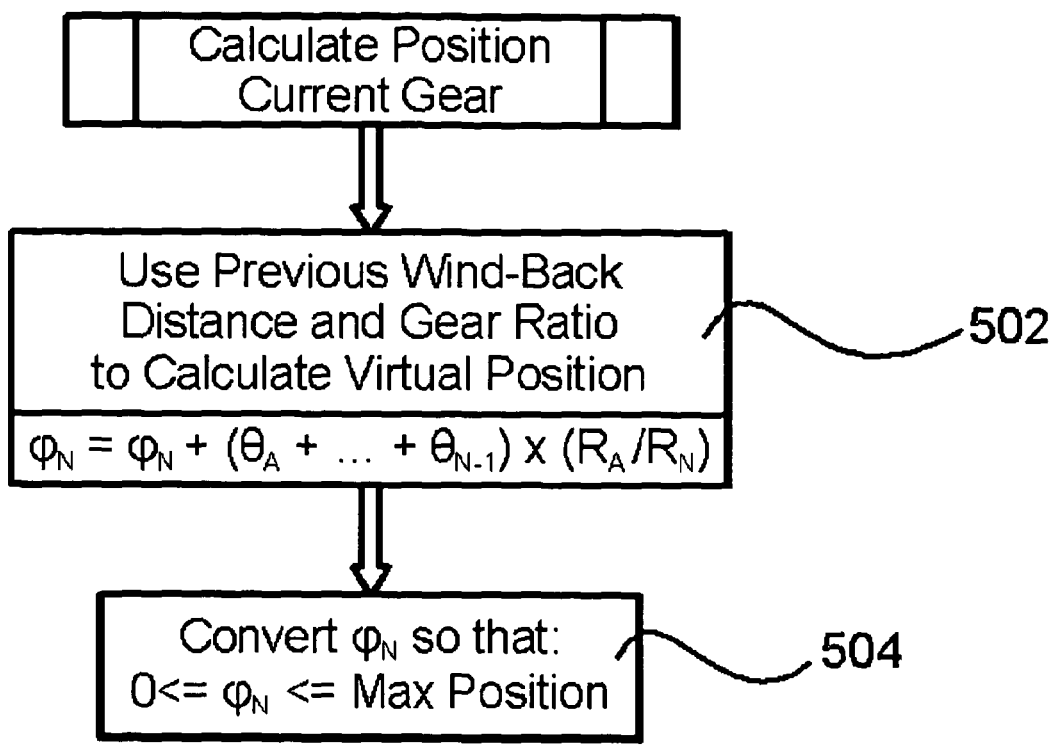
FIG. 5 details the position calculation step.

At step 404 analysis relating to the next gear in the device commences. The gears are considered in order, starting with the one with the fewest number of teeth (after gear A) and working up in order to the gear with the greatest number of teeth, although any ordering could be used. Thus, in the first iteration of these steps, gear B will be analysed. In the formulae shown in the flow charts and referred to below, the letter N is used to refer to refer to the "current" gear being considered. At step 406 the position of gear B is calculated. FIG. 5 illustrates the steps involved in this calculation. At step 502 the previous wind-back distance and gear ratio is used to calculate the new position, $\phi_B$, of gear B, using the general formula shown in FIG. 5, which applied to gear B becomes:

$$\Phi_B = (\theta_A) \times (R_A/R_B)$$

$\Phi_B$ will be used with a look up table, as discussed below, to determine how many zero sequence crossings have ocurred.

At step 504 $\phi_B$ is converted so that it falls between zero and the maximum position. This conversion is a wrapping operation such that the position is output between 0.0 and 360.0°. For example, if a measurement is 345.0° and the ratios were $R_A$=23 and $R_B$=21, then $\phi_B$ would be 345×23/21=377.86° and so could be wrapped by subtracting 360° to 17.86°. $\theta_a$ may be greater than 360°

Figure 6:
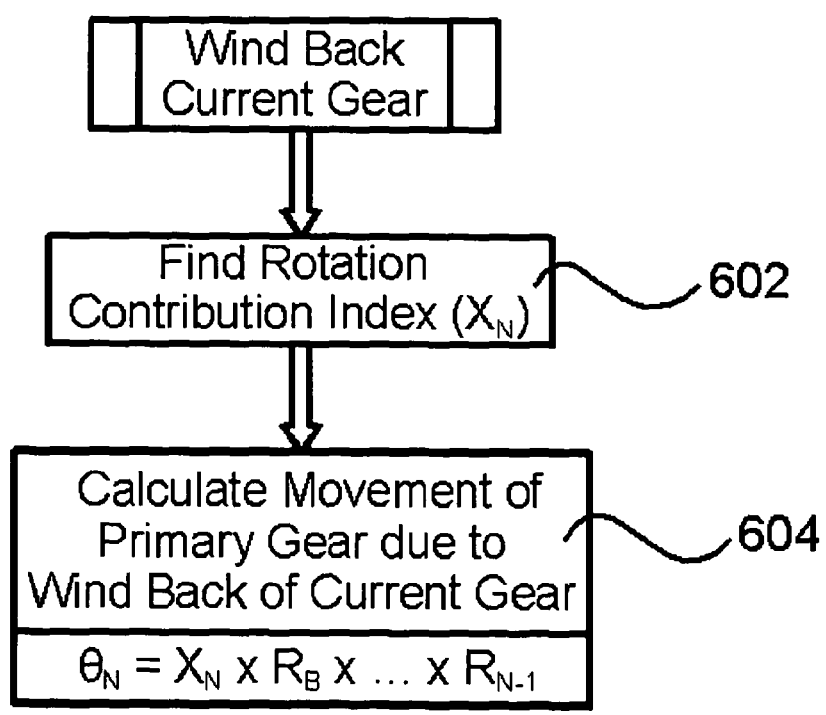
FIG. 6 details the gear "virtual wind back" step.

Returning to FIG. 4, at step 408 gear B is "wound back" to its zero position. FIG. 6 details steps involved in this operation. At step 602 the rotation contribution index of the gear (i.e. how many times all of the previous gears in the sequence have passed through their zero positions together) $X_N$ is found using a look-up table (which will be discussed below). At step 604 the movement of the primary gear (A) due to the winding back of the current gear to its zero position is calculated using the general formula shown in FIG. 6.

Returning to FIG. 4, at step 410 a check is performed as to whether all the gears in the device have been analysed. If not then control passes back to step 404, where the above steps 406-408 are performed for gear C (and then gear D). If all the gears have been analysed then control passes from step 410 to step 412, where the total rotation of the input column is computed. This can be achieved by calculating the absolute position of the input member using the total primary gear (A) rotation and the primary ratio:

$$\text{Position} = \text{Primary Ratio} \times (\theta_A + \ldots + \theta_N)$$

A worked example shall now be given, making reference to FIGS. 7A-7D. FIG. 7A shows the gears A-D in a given state 702A when measurement of the absolute position is to be made. As discussed above, the first step (step 402 of FIG. 4) is to "wind back" the primary gear A to zero, as shown schematically/conceptually at 702B (with the circle on the gear disk indicating its current positions and all the zero positions being at 0°). This can be achieved by taking the current position of gear A and winding it back to zero, whilst recording the value of rotation. For example, if gear A is at position 57.43°, winding it back is equivalent to turning it through −57.43°. Knowing that gear A has been conceptually rotated through this angle, it is possible to work out how far the other gears would have turned based on the gear ratios.

Next, when gear A is back at its conceptual zero position, the positions of the next gear (gear B) is calculated based on the gear ratios and the amount that gear A was conceptually turned. Gear B is then conceptually wound back so that both gears A and B are at their zero positions, as shown schematically at 704 in FIG. 7B. This may involve several rotations of gear B because when one gear in the system is moved, all of the gears rotate. This process continues until the whole gear train is conceptually back at its zero position.

The new position of gear B is calculated (step 406) since gear A has been rolled back. This can be done by taking the total number of rotations required to roll back gear A to its zero position, and applying the gearing ratios to find the change in gear B. Since this value represents rotational position, a pass-through-zero or a full turn must be handled:

$$\phi_{B(New)} = \phi_{B(Old)} - \left(\theta_A \times \frac{R_A}{R_B}\right)$$

This is the number of times gear A must be rotated again to reach its zero position at the same time as gear B reaches its zero position (step 408). This value is recorded and added to the rotations from winding back gear A.

The procedure for rolling each subsequent gear is identical to that of rolling back gear B: each is based on the position after winding back the previous gear and the ratios between the various gears. The position of gear C is first calculated from the total wind back rotations of the gear A thus far, and from this the lookup table is used to find the number of times the previous gears A and B have moved through zero at the same time. This number is then used to find how much the first gear A must have rotated to have gears A, B and C at their zero positions together (shown schematically at 706 in FIG. 7C). This movement value is the number of times gears A and B have been at zero positions together, multiplied by the relative ratios of movement of gear B (13 in the example). These numbers result from the need to have gears A and B at their zero positions together; thus, gear A must move in multiples of 13 to keep gear B at its zero position. Once this process is complete gears A, B and C should all be at zero and gear D is then analysed:

$$\phi_C = \phi_C - \left((\theta_A + \theta_B) \times \frac{R_A}{R_C}\right)$$

$$\theta_C = X_C \times R_B$$

The process for analysing gear D is identical to that of gear C, with the exception that the first gear must also move in multiples of 17 to incorporate the fact that gear C must remain at zero:

$$\theta_D = X_D \times R_B \times R_C$$

Once all the gears A-D are virtually wound back to their zero positions (shown schematically at 708 in FIG. 7D), the final step is to look back on the total rotation of the first gear from each wound-back gear and combine them and then relate this value to the input column using the primary ratio, i.e:

$$\theta_{TOTAL} = \theta_A + \theta_B + \theta_C + \theta_D$$

Absolute Position = $P.R. \times \theta_{TOTAL}$

As mentioned above, look-up tables can be used to find the number of times the previous gears in the device have passed their zero positions in order to compute the current position for a particular gear. The "wound-back" position of the gear being considered can then be compared to these stored positions, and the corresponding position used to give the number of zero sequences of the previous gears. It will be appreciated that this is optional and the zero position passes could be determined by another mathematical method, or data stored in another manner. Example look-up tables for the example device of FIG. 3 are given below:

| Gear B | | Gear C | | Gear D | |
|---|---|---|---|---|---|
| Gear Position | $X_B$ (B Rotation Contribution Index) | Gear Position | $X_C$ (C Rotation Contribution Index) | Gear Position | $X_D$ (D Rotation Contribution Index) |
| 0 | 0 | 0 | 0 | 0 | 0 |
| 0.076923 | 6 | 0.058824 | 5 | 0.055556 | 1 |
| 0.153846 | 12 | 0.117647 | 10 | 0.111111 | 2 |
| 0.230769 | 5 | 0.176471 | 15 | 0.166667 | 3 |
| 0.307692 | 11 | 0.235294 | 3 | 0.222222 | 4 |
| 0.384615 | 4 | 0.294118 | 8 | 0.277778 | 5 |
| 0.461538 | 10 | 0.352941 | 13 | 0.333333 | 6 |
| 0.538462 | 3 | 0.411765 | 1 | 0.388889 | 7 |
| 0.615385 | 9 | 0.470588 | 6 | 0.444444 | 8 |
| 0.692308 | 2 | 0.529412 | 11 | 0.5 | 9 |
| 0.769231 | 8 | 0.588235 | 16 | 0.555556 | 10 |
| 0.846154 | 1 | 0.647059 | 4 | 0.611111 | 11 |
| 0.923077 | 7 | 0.705882 | 9 | 0.666667 | 12 |
| | | 0.764706 | 14 | 0.722222 | 13 |
| | | 0.823529 | 2 | 0.777778 | 14 |
| | | 0.882353 | 7 | 0.833333 | 15 |
| | | 0.941176 | 12 | 0.888889 | 16 |
| | | | | 0.944444 | 17 |

The left-hand column in the table for each gear B-D shows the position of that gear when the previous gear(s) in the sequence/order (A, B and C) are all at their zero position(s). The right-hand column in that gear's table shows how many times all of the previous gears have passed through their zero positions together, when the gear is in the corresponding position indicated in the left-hand column. Using this table it is therefore possible to find the number of zero positions that previous gears have passed through by comparing the calculated gear position to the theoretical position, and matching the closest values. It is important to note that if a gear is closer to a full rotation, i.e. 1, than the next largest value, then this is treated as a full rotation, and thus zero position.

The look-up tables can be generated by moving the gears through their zero positions and recording the position of the gear for each cycle until it repeats. This could be done, for example, by performing a software simulation. In detail, calculating the Gear B section of the lookup table is a matter of moving through the zero cycles of gear A, as this is the only gear that precedes gear B. Gear B will have 13 different positions for each zero position of A before it repeats; after 13 full rotations of gear A, both gears A and B will be at their zero positions together again. An example calculation is as follows:

Gear A Zero Cycles = 2, $$\phi_B = 2 \times \frac{11}{13}$$

$$\phi_B = 1.6923 \rightarrow \phi_B = 0.6923$$

In general:

$$\phi_B = Zeros_A \times \frac{R_A}{R_B}$$

Calculating the table for gear C is similar to gear B; however, there are now 17 total positions to calculate before the sequence loops. The zero cycle must also include gear B. The general equation is:

$$\phi_C = Zeros_{AB} \times \frac{R_A \times R_B}{R_C}$$

Gear D follows the logical sequence and now has 18 unique positions, and the zero cycles include C. The equation for gear D is:

$$\phi_D = Zeros_{ABC} \times \frac{R_A \times R_B \times R_C}{R_D}$$

It will be understood that the rotatable members can be analysed in any sequence (e.g. not necessarily starting with gear 104A). The analysis can be performed in any order so long as the look-up tables have been calculated for the appropriate sequence.

When the measurement error of the measurement of individual gear positions becomes too great, the algorithm may return an incorrect value. Before this point, the error in the device will be the measurement error of the first measurement gear, multiplied by the primary ratio.

The maximum allowable peak error of the sensing device(s) before the algorithm fails can be calculated as:

$$\text{Maximum Error} = \frac{180°}{R_A + R_N}$$

Thus, for the gear ratios adopted in the example, high accuracy sensors are not required. The sensors can be relatively coarse as they only need to meet the 180°/($R_A+R_N$) maximum error requirement. The resolution of the position is then only dependent on the chosen first gear. This can allow the use of 'n−1' low-accuracy sensors and one very high accuracy sensor to provide a high turn-count, multi-turn position-providing device with a very high accuracy.

The maximum error budget of the device can be found as the point at which the rotatable member with the highest ratio, and thus the smallest rotational distance between each zero sequence calculation position, can no longer be known with confidence. This will occur when the total error on the member is greater than the distance between two previous members' zero sequence positions divided by two because at this point the calculated "wind-back" position will be closer to the wrong look-up table position.

Figure 8A:
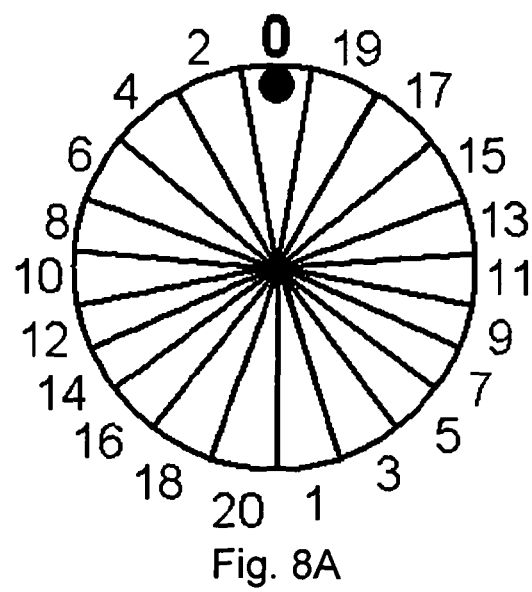
FIGS. 8A and 8B illustrate an example of angular measurement of a rotatable member of the device.
Figure 8B:
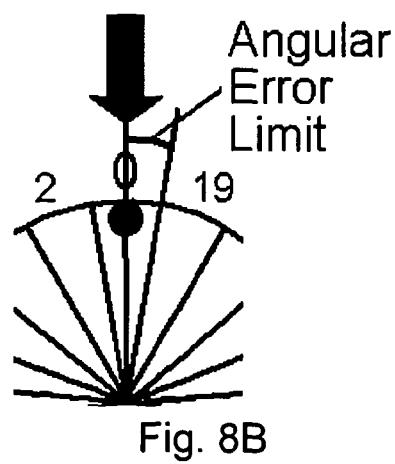

As a visualisation of this problem, each of the rotatable members (with the exception of the primary member) can be conceptually split into segments. Each of these segments represents the range of positions for which the "wound-back" position can be considered to relate to the corresponding number of previous member zero sequences, as listed in the look-up tables. An example rotatable member with 21 segments is shown in FIG. 8A, with appropriate segments labelled with the corresponding rotation contribution index. The rotatable member is shown at its reference position, in the exact centre of the 0 segment. Theoretically, the member should always be measured in a position such that the "calculate position" stage of the calculation with previous members wound back will return a value in the exact centre of one of the segments, i.e. corresponds to a position from the look-up table. However, when the error causes this calculated position to drift into a neighbouring segment there will be a significant increase in output error as the number of previous member zero position sequences will change, potentially dramatically. This angular error is illustrated in FIG. 8B.

Considering the two major forms of error, measurement error and mechanical error (backlash), the maximum allowable error can be found by considering the point at which the returned value of zero sequences from the analysis of the highest ratio member is incorrect. Backlash will have a direct effect on the position relative to the primary member; however, the measurement error affects the result in two ways. The first is by simply corrupting the value measured on the member, and the second is by corrupting the value of the primary member, which is then translated onto the analysed member during the first stage of calculation, i.e. when the primary member is "wound back". If this is incorrect then when the last known previous member zero sequence position of the analysed member is calculated, there will be further discrepancy between the calculation from the true value.

In mathematical terms the allowable error can be expressed as follows:

$$\frac{360°}{2 \times R_N} > E_N + E_A \times \frac{R_A}{R_N} + B_{AN}$$

where $E_N$ is the measurement error of the member under analysis, N, $E_A$ is the measurement error of the primary member, and $B_{AN}$ is the backlash between the primary member and N.

$$E_N + E_A \times \frac{R_A}{R_N} + B_{AN}$$

can be thought of as the total error in the device, with $$\frac{360°}{2 \times R_N}$$

as the error limit. If the total error is not less than the error limit for all members, then the decoding will not work.

Another way in which an error can be introduced in the device is time delay between measuring each rotatable member. This will introduce another term to the equation as follows:

$$\frac{360°}{2 \times R_N} > E_N + E_A \times \frac{R_A}{R_N} + B_{AN} + Td_N \times v_N + Td_A \times v_A \times \frac{R_A}{R_N}$$

$$\frac{360°}{2 \times R_N} > E_N + E_A \times \frac{R_A}{R_N} + B_{AN} + (Td_N + Td_A) \times v_A \times \frac{R_A}{R_N}$$

where $Td_N$ is the time delay to measuring n, $Td_A$ is the time delay to measuring the primary member, $v_N$ is the rotational speed of N, and $v_A$ is the time delay to measuring N. This type of error can be eliminated by using a symmetrical reading algorithm, whereby the measurements of each member are arranged around a single point in time. This removes the effects that cause the decoding algorithm to fall over as each measurement is effectively at the same point in time (assuming constant movement). This method can, however, still be susceptible to error from acceleration, but the acceleration that would be required to affect it would be extremely large as, in practice, the time delays are very small.

In certain implementations of the device there is a possibility that all of the rotatable members may not be capable of being positioned at the reference position simultaneously. This can happen, for example, if there is no fixed way of ensuring that the members are assembled in correct relative locations. There are ways of trying to ensure that does not occur, such as using toothed gears with the number of teeth equal to the minimum function of revolution (e.g. in a three rotatable member example with ratios 10, 21 and 17) if these were toothed gears with 10, 21 and 17 teeth, and properly aligned sensors for the driving arrangement. This arrangement would ensure that the members could only ever be placed in whole segment intervals, whereas if there were 20, 42, and 34 teeth then it would be possible to place a gear out by half a segment. One possible solution to this problem is to have an assembly process intended to prevent incorrect assembly, for example a fixed mechanical structure can be used as a guide that will not allow for improper assembly, or guides/formations, such as 105 or 107 mentioned above, can be used. An alternative solution is that the first time the device is powered up, a measurement is taken and the arrangement of the rotatable members can be calculated from this position using the "wind-back" stage of the calculations, and the known assembled positions of the rotatable members.

To deal with the risk of one or more sensor failing, one or more redundant sensors can be provided, associated with one or more of the rotatable members so that if a particular sensor fails then a redundant sensor can be used instead. This can be achieved, for example, with RF and magnetic sensors as the magnetic and RF fields permeate over a large area. The redundant sensor may be positioned on an opposite side of the rotational axis of the rotatable member, or may be positioned elsewhere, e.g. between the primary sensor and the member, or behind the primary sensor. Should this technique not be feasible for a particular embodiment then an alternative is to discard the faulty sensor's readings and operate the device over a reduced absolute range. Using the example of faults being detected on sensor 104B of FIGS. 1 and 2, the device will use the readings based on the remaining three rotatable members 104A, 104C and 104D. This will mean that its range will reduce; however, this can be sufficient for some applications. In this mode a new lookup table may need to be generated/used, based on the relationships between the remaining rotatable members.

In this reduced range mode it may be necessary to extend the range of the device over more cycles than may normally be possible. In order to do this an incremental counter (e.g. shown schematically at 114C in FIG. 2) can be used to keep track of the number of times that the system has passed through its total range. In this failure mode, the apparatus can lose its ability to confidently provide an accurate position reading when power is restored if the device has moved a significant amount (e.g. more than half of the reduced range) with the power off.

Figure 9:
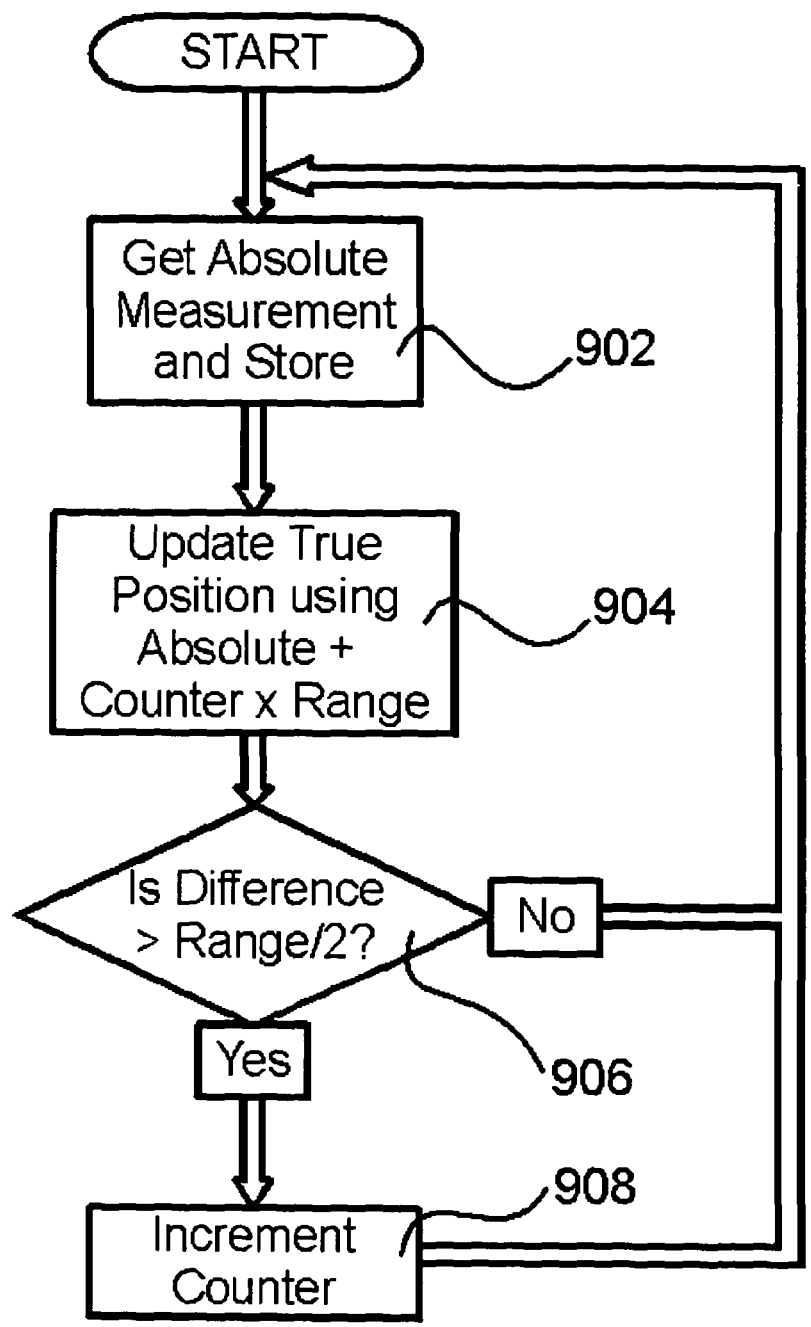
FIG. 9 is a flowchart showing operation of the apparatus involving an incremental counter.

An example of the operation of the device in this reduced range mode is shown in FIG. 9. In this mode if the incremental count is lost then the position is not absolutely defined by the device. At step 902 the absolute measurement of one of the rotatable members still in use is obtained. At step 904 the true position of the member is calculated by adding the number of turns of the member, as recorded by the incremental counter, to the absolute measurement value. At step 906 a check is performed to see if the difference between the value currently measured and the value measured at the previous iteration is greater than the range of the device divided by two. If this is not the case then control passes back to step 902; otherwise at step 908 the counter is incremented and then control passes to step 902 again.

As all of the gears turn at the same time, but at unique rates, a reduced range of absolute positions can be determined by looking at any combination of gears. This provides built-in redundancy and/or the ability to check for read errors. The ability to use incremental counters as described above can offer increased measurement speed as the position of only one member is being measured at any one time.

A disadvantage with conventional mechanical indexing systems is that if there is a fault in one of the members and it does not update as it should then this is almost impossible to detect. With a continually moving arrangement, as is the case in embodiments of the present apparatus, it is relatively simple to detect faults. As all of the movement ratios are known, it is possible over the course of several samples to detect faults in parts of the device. After two samples of each rotatable member it is possible to tell how far each member has moved, provided that these samples are not taken after several rotations. From this it is possible to derive how far each member should have moved as all of the ratios of movement are defined.

Multiple subsets of gears can be used for self-checking over a reduced range. In this configuration, the subsequently-sensed members/gears can be used to verify the accuracy, and check for read errors in the chosen sensed member. Further, in this configuration, the number of turns that the device can record is unlimited. The ability to use a single sensed element with an incremental counter offers the advantage of increased measurement speed as only one gear is being read at any one time. The device may also be configured to provide the option of taking measurements using all of the rotatable members to confirm the input member's position.

The device may be configured to automatically switch into one of the "redundancy modes" described above, or may allow a user to set the mode.

By increasing the resolution of a chosen first members (e.g. 104A in the example, although the chosen sensing element doesn't have to be the first gear in the train) the resolution of the device 100 can be increased. This can enable the input ratio to the sensor to be manipulated in order to obtain the required balance between the final number of turns required to be measured, and the necessary accuracy that is desired. The range of the device can be increased by changing the primary ratio leading to the device assembly at the cost of reducing the resolution.

The device can continue computing the position beyond its absolute range; it will wrap at that point, but in some applications that can be tolerated.

The invention claimed is:
1. Apparatus adapted to provide an indication of an angular position of an input member over multiple turns, the apparatus comprising:
    a set of rotatable members configured, in use, to rotate in accordance with rotation of an input member,
    a set of sensing devices configured to measure and output an angular position of at least one of the rotatable members, and
    a device configured to use the angular position measurements from the set of sensing devices to produce an indication of an angular position of the input member over multiple turns,
    wherein the rotatable members are configured to rotate simultaneously but at different rates, the apparatus characterized in that:
the set of rotatable members comprises at least three said rotatable members, and the set of sensing devices comprises at least three said sensing devices configured to measure and output an angular position of a respective one of the at least three rotatable members, and
wherein each of the rotatable members has any unique ratio of revolution with respect to the other rotatable members, and
wherein one of the set of rotatable members directly drives all remaining said rotatable members.

2. Apparatus according to claim 1, wherein each of the rotatable members has a ratio of revolution with respect to the other rotatable member(s), the rotatable members being arranged so that there is no common factor (other than one) amongst the ratios of revolution.

3. Apparatus according to claim 1, wherein the rotatable members comprise gears each having a different/unique number of teeth.

4. Apparatus according to claim 1, where, in use, the rotatable members move along with the input member in a continuous, non-stepped manner.

5. Apparatus according to claim 1, wherein the set of sensing devices provides an absolute position measurement over 360° of one of the rotatable members.

6. Apparatus according to claim 5, wherein the set of sensing devices uses optical, magnetic or RF sensing technology.

7. Apparatus according to claim 5, wherein the apparatus includes A to N said rotatable members, each having a respective ratio of revolution $R_A$ to $R_N$, and wherein a said sensing device has an accuracy such that a maximum allowable peak error in the sensing device is satisfied by:

$$\text{Maximum Error} = \frac{180°}{R_A + R_N}.$$

8. Apparatus according to claim 1, wherein one of the plurality of rotatable members directly or indirectly drives all remaining said rotatable members.

9. Apparatus according to claim 1, wherein the rotatable members are arranged in a co-planar manner.

10. Apparatus according to claim 1, wherein the rotatable members are arranged in a co-axial manner.

11. Apparatus according to claim 1, wherein the apparatus is not provided with constant power.

12. Apparatus according to claim 11, wherein the at least one sensing device measures positions of the rotatable members resulting from movement that took place whilst power was not provided to the apparatus.

13. Apparatus according to claim 11, including a switch arrangement for enabling the at least one sensing device to be activated when the rotatable member(s) move.

14. Apparatus according to claim 1, wherein the set of rotatable members comprises four said rotatable members, and the set of sensing devices comprises four said sensing devices configured to measure and output an angular position of a respective one of the four rotatable members.

15. Apparatus adapted to provide an indication of an angular position of an input member over multiple turns, the apparatus comprising:
at least two rotatable members configured, in use, to rotate in accordance with rotation of an input member,
at least one sensing device configured to measure and output an angular position of at least one of the rotatable members, and
a device configured to use the angular position measurements from the at least one sensing device to produce an indication of an angular position of the input member over multiple turns,
wherein the rotatable members are configured to rotate simultaneously but at different rates, and
wherein the plurality of rotatable members each has a notional zero position and the device is configured to produce the position indication by computing how far the rotatable members have passed through from their zero positions.

16. Apparatus according to claim 15, wherein the computing performed by the device involves virtually winding-back the rotatable members to their respective zero positions.

17. Apparatus according to claim 16, wherein the device is configured to:
virtually wind back a first one of the rotatable members in a sequence to its zero position; then
for each said rotatable member other than the first rotatable member in the sequence:
computing a virtual position of the rotatable member based on an angle through which a previous rotatable member in the sequence has turned when being virtually wound back, and
virtually winding back the rotatable member and all the previous rotatable member(s) in the sequence so that they are at their zero positions.

18. Apparatus according to claim 17, wherein the computing uses stored data, such as a look-up table, representing a position of a said rotatable member when the previous rotatable member(s) in the sequence is/are all at their zero position(s), and data representing how many times all of the previous rotatable members in the sequence have passed through their zero positions together when the rotatable member is in a corresponding said position.

19. Apparatus adapted to provide an indication of an angular position of an input member over multiple turns, the apparatus comprising:
at least two rotatable members configured, in use, to rotate in accordance with rotation of an input member,
at least one sensing device configured to measure and output an angular position of at least one of the rotatable members, and
a device configured to use the angular position measurements from the at least one sensing device to produce an indication of an angular position of the input member over multiple turns,
wherein the rotatable members are configured to rotate simultaneously but at different rates, and
wherein a set comprising more than one said sensing device is provided for measuring the position of a single said rotatable member, such that if one of the sensing devices in the set develops a fault then another said sensing device in the set is used instead.

20. A method of providing an indication of an angular position of an input member over multiple turns, the method comprising:
measuring an angular position of a set of rotatable members configured, in use, to rotate in accordance with rotation of an input member, the rotatable embers being configured to rotate simultaneously but at a different rates, and
producing an indication of an angular position of the input member over multiple turns sing the angular position measurements received from by a set of sensing devices,
the method characterized in that the set of rotatable members comprises at least three said rotatable members, and the set of sensing devices comprises at least three said sensing devices configured to measure and output an angular position of a respective one of the at least three rotatable members, and wherein each of the rotatable members has any unique ratio of revolution with respect to the other rotatable members, and wherein one of the set of rotatable members directly drives all remaining said rotatable members.

21. A method according to claim 20, further including providing at least one incremental counter associated with at least one of the rotatable members, and using output from the at least one incremental counter to calculate the position of the input member based on a count of multiple turns of the at least one associated rotatable member.

22. A method of providing an indication of an angular position of an input member over multiple turns, the method comprising:

measuring an angular position of at least two rotatable members configured, in use, to rotate in accordance with rotation of an input member, the rotatable members being configured to rotate simultaneously but at a different rates, producing an indication of an angular position of the input member over multiple turns using the angular position measurements, taking position measurements of a first one of the rotatable members over a period of time, taking position measurements of another of the rotatable members over the period of time, comparing the measured position of the other rotatable member with an expected position of the other member, given the measured positions of the first member and a known relationship between rotations of the members, and if the measured position of the other rotatable member does not correspond with the expected position then flagging a possible read error state.

23. A method of providing an indication of an angular position of an input member over multiple turns, the method comprising:

measuring an angular position of at least two rotatable members configured, in use, to rotate in accordance with rotation of an input member, the rotatable members being configured to rotate simultaneously but at a different rates, and producing an indication of an angular position of the input member over multiple turns using the angular position measurements; and checking for read errors by detecting lack of angular rotation of at least one of the rotatable members.

24. A method of providing an indication of an angular position of an input member over multiple turns, the method comprising:

measuring an angular position of at least two rotatable members configured, in use, to rotate in accordance with rotation of an input member, the rotatable members being configured to rotate simultaneously but at a different rates, and producing an indication of an angular position of the input member over multiple turns using the angular position measurements;

wherein the method includes, upon detecting failure of one (or more) of the rotatable members;

measuring an angular position of non-failed said rotatable member(s), and producing an indication of an angular position of the input member over a reduced range of multiple turns using the angular position measurements of the non-failed rotatable member(s).

25. Apparatus adapted to provide an indication of an angular position of an input member over multiple turns, the apparatus comprising:

at least two rotatable members configured, in use, to rotate in accordance with rotation of an input member, at least one sensing device configured to measure and output an angular position of at least one of the rotatable members, and a device configured to use the angular position measurements from the at least one sensing device to produce an indication of an angular position of the input member over multiple turns, wherein the rotatable members are configured to rotate simultaneously but at different rates, wherein each of the rotatable members has a ratio of revolution with respect to the other rotatable member(s), the rotatable members being arranged so that there is no common factor (other than one) amongst the ratios of revolution, and wherein the rotatable members comprise gears each having a different/unique number of teeth.

26. Apparatus adapted to provide an indication of an angular position of an input member over multiple turns, the apparatus comprising:

at least two rotatable members configured, in use, to rotate in accordance with rotation of an input member, at least one sensing device configured to measure and output an angular position of at least one of the rotatable members, and a device configured to use the angular position measurements from the at least one sensing device to produce an indication of an angular position of the input member over multiple turns, wherein the rotatable members are configured to rotate simultaneously but at different rates, wherein the apparatus includes four said rotatable members.

* * * * *